United States Patent [19]

Finley et al.

[11] Patent Number: 4,678,485
[45] Date of Patent: Jul. 7, 1987

[54] VACUUM CLEANER EXHAUST DUST COLLECTOR

[76] Inventors: Martha N. Finley, 1058 Boston Ave., Nederlands, Tex. 77627; George Spector, 233 Broadway Rm. 3615, New York, N.Y. 10007

[21] Appl. No.: 823,076

[22] Filed: Jan. 27, 1986

[51] Int. Cl.⁴ .................. B01D 47/02; B01D 50/00
[52] U.S. Cl. .................................... 55/255; 15/351; 15/353; 15/410; 55/244; 55/357; 55/DIG. 3
[58] Field of Search ............... 55/244, 250, 255, 256, 55/357, DIG. 3; 15/351, 353, 410

[56] References Cited

U.S. PATENT DOCUMENTS

| | | | |
|---|---|---|---|
| 862,369 | 8/1907 | Agan | 15/353 |
| 941,347 | 11/1909 | Markstein | 15/353 X |
| 978,739 | 12/1910 | Griswold et al. | 55/244 |
| 1,253,939 | 1/1918 | Clarke | 55/256 |
| 1,514,723 | 11/1924 | Peters | 55/250 X |
| 1,655,875 | 1/1928 | Orr | 15/351 X |
| 2,191,717 | 2/1940 | Jeffery | 15/353 X |
| 2,405,494 | 8/1946 | Dupuy | 55/255 X |
| 2,609,190 | 9/1952 | Jackson | 55/244 X |
| 2,721,065 | 10/1955 | Ingram | 55/256 X |
| 3,065,489 | 11/1962 | Wright | 15/353 |
| 3,234,713 | 2/1966 | Harper et al. | 55/255 X |
| 4,115,485 | 9/1978 | Genessi | 55/244 X |

*Primary Examiner*—Kathleen J. Prunner

[57] ABSTRACT

A vacuum exhaust dust collector for a standard upright vacuum cleaner is provided and consists of a cylindrical elongated tank holding water therein that has a plurality of air exhaust holes at an upper portion near its neck, at least one elastic band for attaching the tank to an elongated handle of the vacuum cleaner and a flexible elongated hose that has a screw cap near one end that engages with the neck and a retainer clamp at the other end which fits over an exhaust pipe of the vacuum cleaner allowing dust particles to be caught in the water within the tank whereby air exhausted will be dust free.

4 Claims, 5 Drawing Figures

VACUUM CLEANER EXHAUST DUST COLLECTOR

BACKGROUND OF THE INVENTION

The instant invention relates generally to vacuum cleaners and more specifically it relates to a vacuum exhaust dust collector.

Numerous vacuum cleaners have been provided in prior art that are adapted to clean carpets, upholstery and the like. For example, U.S. Pat. Nos. 4,137,599; 4,145,198 and 4,512,057 all are illustrative of such prior art. While these units may be suitable for the particular purpose to which they address, they would not be as suitable for the purposes of the present invention as heretofore described.

SUMMARY OF THE INVENTION

A principle object of the present invention is to provide a vacuum exhaust dust collector that will overcome the shortcomings of the prior art devices.

Another object is to provide a vacuum exhaust dust collector that will replace the paper filter bag allowing dust particles to be caught in water within the vacuum exhaust dust collector whereby air exhausted will be dust free.

Another object is to provide a vacuum exhaust dust collector that can be quickly installed on a standard upright vacuum cleaner without the use of special tools and skills.

A further object is to provide a vacuum exhaust dust collector that is simple and easy to use.

A still further object is to provide a vacuum exhaust dust collector that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
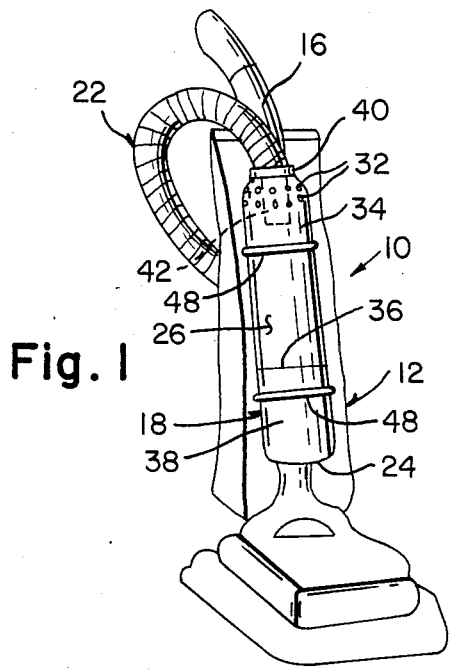
FIG. 1 is a perspective view of a standard upright vacuum cleaner with the invention attached thereto.
Figure 2:
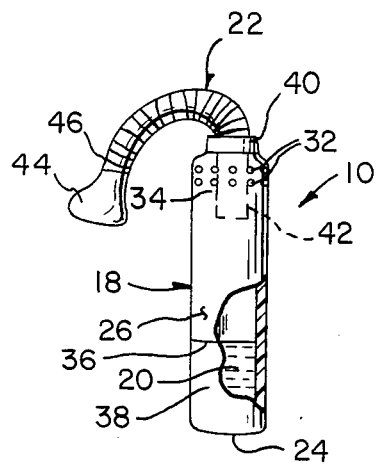
FIG. 2 is a front view of the invention with parts broken away.
Figure 3:
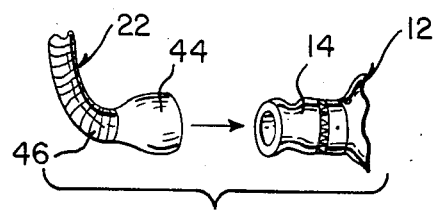
FIG. 3 is a partial perspective exploded view showing how the flexible end of the hose fits over the exhaust pipe on the vacuum cleaner.

Turning now descriptively to the drawings, in which similar reference characters denote similar elements throughout the several views, FIGS. 1 thru 4 illustrate a vacuum exhaust dust collector 10 for a standard upright vacuum cleaner 12 that has an exhaust pipe 14 and an elongated handle 16. The vacuum exhaust dust collector 10 consists of a cylindrical elongated tank 18 for holding water 20 therein and a flexible elongated hose 22.

The tank 18 has a bottom wall 24, a side wall 26 and an externally threaded neck 28 that has an open top 30. The side wall 26 has a plurality of air exhaust holes 32 at upper portion 34 near the neck 28 and a water level line 36 at lower portion 38 about one third the distance above the bottom wall 24.

The hose 22 has a screw cap 40 near one end 42 and a retainer clamp 44 formed at other end 46. The screw cap 40 threadably engages to the neck 28 with portion 42 of the hose extending within the tank 18. The retainer clamp 44 fits over the exhaust pipe 14 of the vacuum cleaner 12. This allows dust particles to be caught in the water 20 within the tank 18 whereby air exhausted through the exhaust holes 32 will be dust free.

Elastic bands 48 fit around the tank 18 and the elongated handle 16 of the vacuum cleaner 12. The elastic bands 48 attach the tank 18 to the vacuum cleaner 12 for easy use of the vacuum exhaust dust collector 10.

Figure 5:
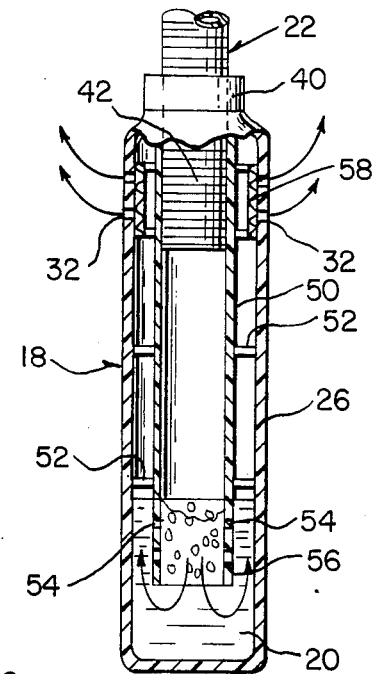
FIG. 5 is an enlarged front view with parts in cross section of a modification in which the tank has an inner sleeve to engage with the hose to bring the exhaust air into the water and through a cloth filter before the exhaust air exits the holes therein.
Figure 4:
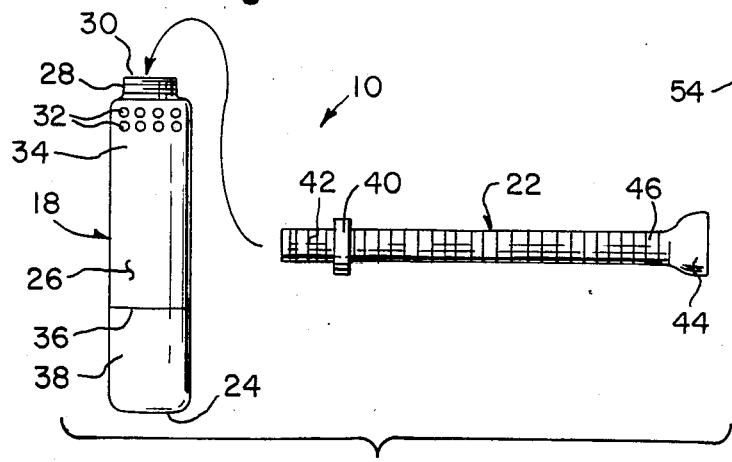
FIG. 4 is a disassembled front view of the invention showing how the screw cap fits on the threaded neck of the tank.

In referring to FIG. 5, a modification is shown wherein the tank 18 further includes an elongated inner sleeve 50 and a plurality of securement ribs 52. The inner sleeve 50 has a plurality of holes 54 at lower end 56. The ribs 52 are placed between the inner sleeve 50 and the side wall 26 of the tank 18. The inner sleeve 50 is positioned therein to engage with the portion 42 of the hose 22 extending within to bring exhaust air directly into the water 20 before the exhaust air exits the air exhaust holes 32 in the tank 18. A cloth filter 58 is positioned within the tank 18 behind the air exhaust holes 32 to increase the filtering action before the exhaust air exits the air exhaust holes.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. In a standard upright vacuum cleaner having an exhaust pipe, and an elongated handle, the improvement comprising a dust collector including:
   (a) a cylindrical elongated tank holding water therein, said tank having a bottom wall, a side wall and an externally threaded neck having an open top, said side wall having a plurality of air exhaust holes at an upper portion near said neck and an external line indicating proper water level at a lower portion of said tank;
   (b) means for attaching said tank to said vacuum cleaner; and
   (c) a flexible elongated hose having a screw cap near one end and a retainer clamp formed at the other end, said screw cap threadably engages to said neck with a portion of said hose extending within said tank while said retainer clamp fits over said exhaust pipe of said vacuum cleaner allowing dust particles to be caught in said water within said tank whereby air exhausted through said exhaust holes will be dust free.

2. An exhaust dust collector as recited in claim 1, wherein said attaching means includes at least one elastic band that fits around said tank and said elongated handle of said vacuum cleaner.

3. An exhaust dust collector as recited in claim 2, wherein said tank further includes:
   (a) an elongated inner sleeve having a plurality of holes at a lower end; and
   (b) a plurality of securement ribs between said inner sleeve and said side wall of said tank so that said inner sleeve is positioned therein to engage with said portion of said hose extending within said tank to bring exhaust air directly into said water before said exhaust air exits said air exhaust holes in said tank.

4. An exhaust dust collector as recited in claim 3, further comprising a cloth filter positioned within said tank behind said air exhaust holes to increase the dust collection action before said exhaust air exits said air exhaust holes.

* * * * *